Nov. 8, 1960 D. M. KRAUSSE ET AL 2,959,626
PROCESS FOR THE PRODUCTION OF STYRENE-GRADE ETHYL BENZENE
Filed July 15, 1957 5 Sheets-Sheet 3

INVENTOR
DAN M. KRAUSSE
GEORGE A. RANDALL
BY
ATTORNEY

United States Patent Office 2,959,626
    Patented Nov. 8, 1960

2,959,626

PROCESS FOR THE PRODUCTION OF STYRENE-GRADE ETHYL BENZENE

Dan M. Krausse, Big Spring, Tex., and George A. Randall, Cambridge, Mass., assignors to Cosden Petroleum Corporation, Big Spring, Tex., a corporation of Delaware Filed July 15, 1957, Ser. No. 672,053

15 Claims. (Cl. 260—674)

This invention relates to a method for producing ethylbenzene in a degree of purity suitable for dehydrogenation to styrene. As a useful dehydrogenation stock for styrene production, the ethylbenzene hereof contains less than 1 volume percent of stable hydrocarbon impurity boiling in the $C_8$ aromatic hydrocarbon range, a range of about 130 to 140° C.

More particularly, the present invention provides a method and apparatus by which ethylbenzene may be superdistilled from a $C_8$ aromatics mixture in at least that degree of purity.

The invention also provides a method of producing a $C_8$ aromatics fraction mixture, containing less than 0.3% of non-aromatic hydrocarbon and comprising a useful charging stock for superdistillation to recover said ethyl benzene from a naphtha containing recoverable quantities of $C_8$ aromatics.

The invention further provides superdistillation apparatus comprising a plurality of two or more columns to effect the distillation of a $C_8$ aromatics fraction from which substantially pure ethylbenzene may be recovered using at least 150 plates or stages, and preferably from 200 to 400 plates or stages; and a critical distillation method of operating such apparatus including a reflux ratio exceeding 40:1 and preferably 60 to 150:1, whereby the ethylbenzene separated has a purity exceeding 99% for styrene production, and practically may exceed 99.995%.

In the production of styrene from ethylbenzene containing more than 1% of impurity by catalytic dehydrogenation, such impurity, if it is not decomposed during the reaction to components of remote boiling point and if it boils in the neighborhood of styrene or ethylbenzene, tends to prevent separation of styrene of adequate purity from the reaction products. A styrene produced from ethylbenzene containing more than about 1% of a stable hydrocarbon boiling in the $C_8$ aromatics range, such as 130–140° C., is useless for usual commercial purposes. If the ethylbenzene contains less than about 1% but more than 0.4% of such impurities, the styrene produced therefrom is useful for preparing synthetic rubber such as GR-S, but not commercially acceptable polystyrene polymer. For the latter purpose the ethylbenzene must contain less than 0.4% impurity. Thus, for commercial purposes, only styrene containing less than 0.4% is useful for direct polymerization to colorless plastic polystyrene, and that grade of styrene produced from such high purity ethylbenzene is known as polymer grade styrene. Styrene produced from ethylbenzene containing less than about 1% but more than 0.4% of stable hydrocarbon impurity, is known as rubber grade styrene.

The ethylbenzene produced by the present method has less than 1% of stable hydrocarbon impurity boiling in the $C_8$ aromatics range, such as from 130 to 140° C., and may be produced by the present method with impurities less than detectable, that is, ethylbenzene containing less than .005% impurity.

As a first step of this method, a $C_8$ aromatics mixture is obtained which contains less than 0.3% of non-aromatic hydrocarbon boiling in the $C_8$ aromatics range.

As a second step, this substantially pure $C_8$ aromatics mixture is superdistilled in a column comprising at least 150 distillation plates or stages, preferably 200 to 400 plates or stages at a reflux ratio exceeding about 40:1, preferably in the range of 60 to 150:1. The term reflux ratio as used herein is the ratio of reflux volume to net overhead product volume.

As a further feature of this invention, stable non-aromatic hydrocarbon components usually occurring with a $C_8$ aromatics extract fraction are displaced during the extraction of naphthas containing an extractable quantity of ethylbenzene by substituting lower boiling, usually non-aromatic hydrocarbon, for the higher boiling non-aromatic hydrocarbon components contained in the aromatic extract, thereby allowing production of a $C_8$ aromatics fraction of substantially pure aromatic components, and in any case, a $C_8$ aromatics fraction which critically contains less than 0.3% of stable non-aromatic hydrocarbon.

According to a preferred practice of this invention, a highly naphthenic naphtha feed stock is aromatized by catalytic dehydrogenation to produce a 40–60% aromatics yield, of which the $C_8$ fraction contains a recoverable quantity, usually more than 10% of ethylbenzene, and we averaged, according to our preferred procedure, about 27 to 34% of ethylbenzene in our $C_8$ aromatics fraction.

Ethylbenzene, prior to the present invention, was produced commercially by alkylation of benzene with ethylene. This catalytic alkylation is an expensive extra step in petroleum conversion to first form the pure benzene and ethylene and then convert them to ethylbenzene. The method of this invention distinguishes that common practice in completely avoiding this catalytic synthetic method by procedures, which in most economical aspect, are applied directly to raw petroleum naphthas first to form large quantities of ethylbenzene therein and then to isolate it from other hydrocarbon components.

It is known in the art that usual conversion of petroleum naphthas, particularly such as contain aromatics will, along with the benzene, toluene and xylene, contain some ethylbenzene. In many naphthas produced by petroleum conversion the aromatic content will vary widely and the ethylbenzene content thereof may vary slightly with the character of the raw naphtha feed stock, but the $C_8$ aromatic fractions separated therefrom average only about 11% of ethylbenzene.

The boiling point of ethylbenzene is so close to that of the xylene isomers contained in the $C_8$ fraction that separation of the mixture even by very fine distillation to obtain an ethylbenzene concentrate in sufficient purity to obtain an ethylbenzene of dehydrogenation quality to produce styrene, has not heretofore been possible. For instance, in this ethylbenzene dehydrogenation, the unconverted ethylbenzene must be separated from the styrene produced, usually in less than 50% yield per pass, by distillation, and recycled for further dehydrogenation. Any stable hydrocarbon boiling in the $C_8$ aromatics range that is present is substantially unaffected and is not removed in the distillation to separate the residual ethylbenzene from the styrene produced, but a portion remains with the ethylbenzene fraction and thereby tends to build up in concentration therein and a portion remains with the styrene tending to increase the ethylbenzene content to further reduce the styrene purity, thereby reducing the quality of the styrene to below commercial acceptibility as described above. Accordingly, the prior attempts to separate ethylbenzene from a $C_8$ aromatics fraction by a distillation of any character, resulted in such high impurity contents as to render the ethylbenzene useless for styrene production.

The separation of ethylbenzene in adequate degree of purity from a $C_8$ aromatics fraction is made possible by the present superdistillation only because substantially all stable non-aromatic hydrocarbon boiling in the $C_8$ aromatics range of about 130 to 140° C., and initially in quantity above about 0.3%, have been removed before that superdistillation is applied. The method of removing such stable hydrocarbon impurities, usually non-aromatics, according to the present invention, comprises extracting the aromatics with a polar type solvent from the mixed hydrocarbon feed stock containing a recoverable quantity of ethylbenzene, usually along with other aromatics. Such polar type solvent is characterized by having a relative selectivity in its solvent effect upon the feed stock hydrocarbon tending to dissolve more aromatics than non-aromatics. In usual operation the solvent to feed ratio may vary from 30 to 5:1.

During the extraction a continuous recycle of lower boiling hydrocarbon, boiling below the $C_8$ aromatics extract range, is maintained to pass such recycle through the aromatics rich solvent solution, thereby tending to displace from the extract any high boiling non-aromatic hydrocarbon dissolved in the aromatic extract solution, and substitute therefor the lower molecular weight non-aromatic hydrocarbon of the recycle. The extract solution is then distilled first to flash off dissolved low volatile non-aromatics for recycle to the aromatic rich solvent solution in the extractor. The aromatic hydrocarbon is then stripped from the solvent in a semi-steam distillation, separating a front end fraction containing any remaining quantity of volatile non-aromatics and some aromatics as overhead, also for recycle. Simultaneously a side stream of substantially 100% aromatics is removed from an intermediate portion of the stripping column.

In a subsequent distillation of the pure aromatics there is first separated benzene, then toluene and finally a $C_8$ fraction containing less than 0.3% and usually substantially no non-aromatic hydrocarbon. That $C_8$ fraction is then superdistilled to recover the substantially pure ethylbenzene as further described below.

It is occasionally found in certain virgin petroleum naphtha stocks that the $C_8$ aromatics fraction contains over 15% of ethylbenzene, and sometimes even as high as 25%. Accordingly, such stocks are useful as feed stock to the extractor when they are available, and while the whole range of the distillate may be used, it will be preferable, before extracting such virgin gasoline, to first separate therefrom a fraction which comprises a concentrate of the $C_6$–$C_9$ aromatics.

It is also known that many gasoline conversion products contain ethylbenzene among their $C_8$ aromatics and such conversion products selected at random from many commercial petroleum conversion processes will average about 11% of ethylbenzene among their $C_8$ aromatics. Such catalytic conversion products, preferably after fractionating to isolate a concentrate of the $C_6$–$C_9$ aromatics, may also comprise a useful feed stock to the extractor of the present invention.

It is found that if a naphtha comprising at least 25% naphthenes boiling in the range of 226–273° F. is catalytically dehydrogenated, large quantities of recoverable ethylbenzene, usually exceeding 15%, are found in the $C_8$ fraction of the aromatics formed therein and therefore, it is preferred to use as feed stock to the present extractor such catalytically dehydrogenated product.

A full boiling range petroleum naphtha boiling from 100 to about 400° F., typically about 140–175° F. IBP up to about 400° F. EP, may comprise the feed stock to the catalytic dehydrogenator, providing it initially contains at least 25% of naphthenes. The yields of $C_8$ aromatics in the aromatized product are also favorably affected by adjusting the feed stock to a high content of hydrocarbons containing at least 25% naphthenes boiling in the range of 226–273° F. Hence, the usual practice of this invention is to feed a naphtha to the catalytic dehydrogenator adjusted to have more than 25% of the feed stock composed of hydrocarbon comprising 25% naphthene boiling in this relatively narrow boiling range. It is found according to this preferred practice of this invention that very high, 27–34% yields of ethylbenzene are obtained when the feed stock to the catalytic dehydrogenator is supplemented by adding much more hydrocarbon boiling in the range of 226–273° F. and which comprises 35 to 55% naphthenes.

For purposes of comparing the yields of ethylbenzene available by the present preferred dehydrogenation procedure to increase the yields, to usual practices, two tables compiled by the Petroleum Refining Laboratory of Pennsylvania State University are reproduced. Table A shows ultimate analysis of the $C_8$ fraction of various straight run naphthas, and Table B shows a similar analysis upon various catalytically converted naphthas:

TABLE A

*Relative amounts of C–8 aromatics present in naphthas*

| Source Naphtha | Straight Run Naphthas [1] | | | | | | | | |
|---|---|---|---|---|---|---|---|---|---|
| | B.P., °C. | Ponca City | East Texas | Bradford | Michigan | Winkler, Texas | Midway, Calif. | Conroe, Texas | Average |
| | Volume percent of total C-8 Aromatics | | | | | | | | |
| C-8 Aromatics: | | | | | | | | | |
| Ethylbenzene | 136.2 | 18 | 17 | 9 | 15 | 25 | 24 | 8 | 17 |
| P-xylene | 138.4 | 9 | 13 | 16 | 12 | 39 | 16 | 16 | 17 |
| M-xylene | 139.1 | 48 | 48 | 56 | 51 | 26 | 38 | 57 | 46 |
| O-xylene | 144.4 | 25 | 22 | 19 | 22 | 10 | 22 | 19 | 20 |
| Total | | 100 | 100 | 100 | 100 | 100 | 100 | 100 | 100 |

[1] Rossini, F. D., Hair, B. J., Streiff, A. J., Hydrocarbons from Petroleum, ACS Monograph 121, pages 440 and 462.

TABLE B

*Catalytic naphthas*

| Type of Cracking | B.P., °C. | Hydro-Forming | Fixed Bed | | Fluid | |
|---|---|---|---|---|---|---|
| | | | 2-Pass | 3-Pass | Low Temp. | High Temp. |
| Reaction Temp., °F | | 925 | 850 | 875 | 800 | 975. |
| Charging Stock | | Selected Naphtha | Gas Oil+ Heavy Distillate | Hvy. Naph. from 2-Pass | Kerosene | Gas Oil. |
| | | Volume Percent of Total C-8 Aromatics | | | | |
| C-8 Aromatics: | | | | | | |
| Ethylbenzene | 136.2 | 11 | 13 | 9 | 13 | 13. |
| P-xylene | 138.4 | 18 | 19 | 20 | 18 | 20. |
| M-xylene | 139.1 | 47 | 48 | 52 | 45 | 49. |
| O-xylene | 144.4 | 24 | 20 | 19 | 24 | 18. |
| Total | | 100 | 100 | 100 | 100 | 100. |

| | 38E 80 [1] | 38H 65 [1] | 38K 65 [1] | 30Y 82 [1] | 36R-Y 66 [1] | Avg. of |
|---|---|---|---|---|---|---|
| Reaction Temp., °F | 975 | 975 | 975 | 1,000 | 975 | 10. |
| Charging Stock | Light Gas Oil. | Light Gas Oil. | Heavy Gas Oil. | Gas Oil | Gas Oil | |
| | Volume Percent of Total C-8 Aromatics | | | | | |
| C-8 Aromatics: | | | | | | |
| Ethylbenzene | 10 | 13 | 9 | 11 | 9 | 11. |
| P-xylene | 22 | 19 | 15 | 20 | 18 | 19. |
| M-xylene | 48 | 43 | 44 | 45 | 45 | 47. |
| O-xylene | 20 | 25 | 32 | 24 | 28 | 23. |
| Total | 100 | 100 | 100 | 100 | 100 | 100. |

[1] Vol. percent conversion.

It will be apparent from the data of Table A that there are some virgin naphthas which naturally contain usefully recoverable quantities of ethylbenzene and some contain relatively high quantities of ethylbenzene in the C-8 fraction whereby such is even more valuably recovered by the present method. With respect to data represented in Table B it is apparent that ethylbenzene available in the $C_8$ fraction of catalytic conversion stocks by any of the commonly practiced conversion methods is much lower than in Table A, the highest being only 13% of the $C_8$ fraction, and the average, only 11%, but these too may be usefully recovered. The yield of ethylbenzene by the preferred practice of the present invention may exceed the best of any available virgin or general catalytically produced gasoline stocks.

Accordingly, it is the preferred practice of this invention to aromatize a narrow B.P. range high naphthenic naphtha fraction by catalytic dehydrogenation. The aromatization or dehydrogenation comprises passing the naphtha over a dehydrogenation catalyst, typically a platinum containing catalyst, at a temperature in the range of about 825–975° F. and at a pressure in the range of about 200–500 p.s.i.g. in the presence of at least 4 to 12 mols, preferably 6 to 8 mols of hydrogen per mol of hydrocarbon fed to the unit. The catalytic dehydrogenator comprises several catalytic contact chambers in which dehydrogenation catalyst is distributed for optimum contact with the hydrocarbon vapors and hydrogen mixture, the apparatus providing means for reheating the vapors at intermediate points between contact chambers to maintain the reaction conditions, there being several, such as 3 to 6 catalytic contact chambers in a dehydrogenation assembly.

The dehydrogenation yield comprises about 75–90 wt. percent of the feed stock, the other products formed comprising some 4–6 wt. percent of hydrogen gas, and the balance, gases and light liquids separated in a stabilizer. The reaction product after stabilizing and splitting to remove lower volatiles contains at least 30% of aromatic hydrocarbon and usually ranges from about 40 to 60% before solvent separation.

The catalytic dehydrogenation product is stabilized to remove the volatile material which boils substantially below the $C_6$ aromatics, the product being generally fractionated to an initial boiling point of about 140–155° F. Thereafter the stabilized product is extracted with a polar type solvent in which the solvent tends to dissolve greater quantities of aromatics than non-aromatics.

The character of the solvent may vary widely and includes such typical solvents as lower alkylene glycols such as ethylene, propylene or butylene glycols, lower alkylene glycolethers such as diethylene glycol and dipropylene glycol, furfural, phenol, liquid sulfur dioxide, liquid ammonia, nitrobenzene, aromatic amines such as aniline or toluidine, lower alkyl (1–6 carbon atom) primary, secondary and tertiary amines, and corresponding lower alkanol amines such as tri methyl amine, di ethyl amine, di butyl amine, di ethanol amine, tri ethanol amine and the like, and other polar solvents known in the petroleum extraction art, as well as mixtures thereof, may be used as the solvent. Generally the solvent is modified to impart a small water content for purposes of adjusting its selectivity, primarily to reduce its solvent power for non-aromatic hydrocarbon.

The solvent extraction is usually operated with continuous countercurent flow of hydrocarbon to be extracted and solvent, with aromatic rich solvent being withdrawn from one end of the extractor and raffinate at the other. A continuous displacement from the extract of high boiling non-aromatic hydrocarbon by lower boiling non-aromatic hydrocarbon is effected by continuously introducing low boiling non-aromatic hydrocarbon into the extract. The principle here followed to effect a desirable extraction of the aromatic hydrocarbon is based upon the fact that, whatever may be the absolute solubility of non-aromatics in the solvent solution of extracted aromatics, that solvent solution of aromatics has a greater solvent power for non-aromatic hydrocarbon of lower molecular weight than for similar non-aromatic hydrocarbon of higher molecular weight. By continuously passing more volatile lower molecular weight hydrocarbon into the solvent solution of aromatics, any higher molecular weight higher boiling non-aromatic hydrocarbon tends to be displaced from the extract solution into the raffinate and be replaced by the lower boiling non-aromatic hydrocarbon. Thus, the extract solution of aromatics in the polar solvent obtained from this extraction has its non-aromatic content of hydrocarbon composed substantially entirely of low boiling hydrocarbon. In operation of this extraction the low boiling hydrocarbon will be selected to boil below the $C_8$ aromatics range, and, to aid in practical economical recovery of other aromatics, even below the $C_6$ aromatics. The total hydrocarbon content is thereafter stripped from the solvent by distillation, both aromatic and non-aromatic hydrocarbon, and because of the substantial difference in boiling points the more volatile lower boiling non-aromatic hydrocarbon may readily be separated from the aromatics. The low boiling hydrocarbon usually boils below 140° C.

In a preferred procedure, a lower alkylene glycolether, such as diethylene glycol or dipropylene glycol, and usually mixtures with a small quantity of water are used as the selective polar type solvent. The solvent is contacted countercurrently with the feed in usual ratio of 30 to 5 parts, preferably 10 to 15 parts, of solvent to 1 part by volume of hydrocarbon feed to be extracted. Obviously any higher ratio could be used with corresponding loss of economy in the process. Such solvent is preferred because it allows the extraction operations to be carried out at substantially raised temperatures and pressures for optimum efficiency. It allows easier separation of the hydrocarbon from the solvent, the more volatile non-aromatics by flashing, and the aromatics in a subsequently applied semi-steam type of stripping with good heat economy. The pure aromatics are readily taken off of a stripping column as a side stream from an intermediate position of the stripping column with any front end content of more volatile non-aromatic hydrocarbon passing overhead.

It is preferred, for ready volatilization of the non-aromtics from the aromatic extact hydrocarbon, to use as non-aromatic displacement feed, a low volatile substantially saturated lower paraffin hydrocrbon, predominantly $C_5$ paraffins or a $C_5$ fraction which may contain minor quantities up to about 20% of $C_4$ and $C_6$ paraffins, and as a typical $C_5$ fraction, the feed for displacement to the extractor will usually contain some of both. Such low boiling non-aromatics after separation from the aromatics is recycled to the extractor for continuously displacing heavier non-aromatics from the extract into the raffinate. The total non-aromatic recycle may vary widely from about 1 to 20 volume percent per volume of the extract solution, usually 1 to 5%. Since that volatile non-aromatic hydrocarbon distillate which dissolves in the aromatic solvent solution may be recovered simultaneously with the stripping of the aromatics from the solvent in a stripping column, with the aromatics taken off as a side stream, the stripping in the column may be adjusted to take along with the non-aromatic overhead some 5–10% aromatics. Thereby the side stream aromatic taken off from the column may comprise substantially 100% pure aromatics, and the small 5–10% quantity of aromatics taken overhead with the more volatile non-aromatics become recycled and continuously recovered with the extract in the extractor.

In recycling of the low volatile substantially non-aromatic fraction, it is preferred to pass the same upwardly into the bottom of a continuously descending extract solution formed in a vertical column, from which the raffinate is removed at the top, whereby the non-aromatics introduced into the aromatics rich solution act as a continuous wash of the aromatic rich extract and displaces the high boiling non-aromatics upwardly into the column.

While the present invention is directed primarily to production of substantially pure ethylbenzene, inasmuch as the aromatic fraction produced is substantially pure aromatics, it is desirable, for over-all economy of the process, to separate $C_6$ and $C_7$ aromatics in separate preliminary distillations, and then separate a pure $C_8$ fraction from the residual $C_9$ and higher aromatics. For this purpose the purely aromatic extract, after clay treatment to remove trace quantities of color forming impurities, is fractionated to separate benzene first, then toluene and then fractionated to separate the $C_8$ fraction from the $C_9+$ bottoms. Hence, this preliminary fractionation is carried out under narrow boiling point range conditions, thereby to obtain a higher degree of purity for each of these $C_6$ and $C_7$ components. For instance, a benzene distillation column is used having at least 12 stages or plates, preferably about 35 to 45 stages and operated with a minimum reflux ratio of at least 1.3:1, preferably about 5 to 7:1, to remove the benzene. In such distillation benzene of 0.884 sp. gr. at 60° F. with a distillation range of 0.5 to 1° C. and a freezing point in the range of 5.3 to 5.45° C., is produced.

In a similar manner toluene may be distilled from the residue of the benzene distillation by distilling in a column having more than 14 stages or plates, preferably from about 35 to 45 stages or plates, operated with a reflux ratio of at least 1.0:1, preferably from about 2.0 to 4.0:1. The toluene thereby produced as overhead may have a boiling point range of 0.5 to 1° C. and a sp. gr. at 60° F. of 0.872. It will be apparent with these fine distillations that both benzene and toluene may be recovered in a reagent grade of purity greatly enhancing the economy of this process.

Either the total $C_8$ plus residue of the toluene distillation, or a $C_8$ fraction immediately distilled therefrom, is superdistilled in a column of at least 150 stages or plates, preferably 200–400 stages with a reflux ratio of at least 40:1, preferably 60–150:1 thereby to produce ethylbenzene as an overhead having at least the 99% purity as stated above. If the total $C_8$ plus residue is superdistilled, the bottoms residue of that superdistillation will consist of residual $C_8$ (mixed xylenes substantially free of ethylbenzene) and $C_9+$ aromatics. In this procedure the residue of such superdistillation consisting of xylene isomer and $C_9+$ aromatics may be returned to a xylene distillation column from which the isomeric mixture of pure xylenes may be separated from the $C_9+$ hydrocarbon.

As an alternate procedure the bottoms or residuum of the toluene distillation may be first distilled in a wide boiling range of 4–10° C. merely to separate in an ordinary distillation the $C_8$ aromatics from the $C_9+$ and, thereafter, this wide, 4–10° C. boiling range $C_8$ overhead fraction may be superdistilled.

Within the limits of minimum distillation stages and reflux ratio stated for the superdistillation, ethylbenzene may be separated from the $C_8$ aromatics mixture, if the stable non-aromatic hydrocarbon content in the $C_8$ boiling range is less than 0.3%, in purity of at least 99%. In preferred ranges of conditions given, that is, with more than 200 stages and a reflux ratio of more than 60 to 1, the ethylbenzene obtained has a purity of 99.995%.

The invention is further described with reference to a specific embodiment illustrated in the drawings, wherein.

A raw feed stock to be catalytically dehydrogenated to form aromatics therein may be first separated into a naphtha boiling in the range of 100 to 400° F., preferably a narrower boiling point range high naphthene naphtha of approximately $C_6$–$C_9$ hydrocarbon. The formation of such feed stock is illustrated in the feed preparation section Fig. 1. For this purpose, a wider boiling range naphtha, which may be a virgin gasoline or a re-run gasoline, preferably highly naphthenic or of gasolines blended to include a substantial quantity of naphthenic hydrocarbon, is drawn by pump 10 from inlet line 12, and passed by way of line 14 and a heat exchanger 16, to a prefractionator column 18, in which the more volatile ends boiling below 100° F., and usually below the desired initial boiling point feed stock, preferably below the range of 140–175° F., are removed. These light volatile vapors pass overhead of the column 18 through line 20, are cooled to condense a substantial portion to liquid in heat exchanger 22, and then are sent to surge drum 24 from which uncondensed gases are removed through line 26. The condensed liquid is withdrawn through line 28 by pump 30, and part of the liquid is returned by way of line 32 to the top of the prefractionator column 18 as reflux, and the remaining portion is sent to storage via a stabilizer (not shown) through line 34.

Figure 1:
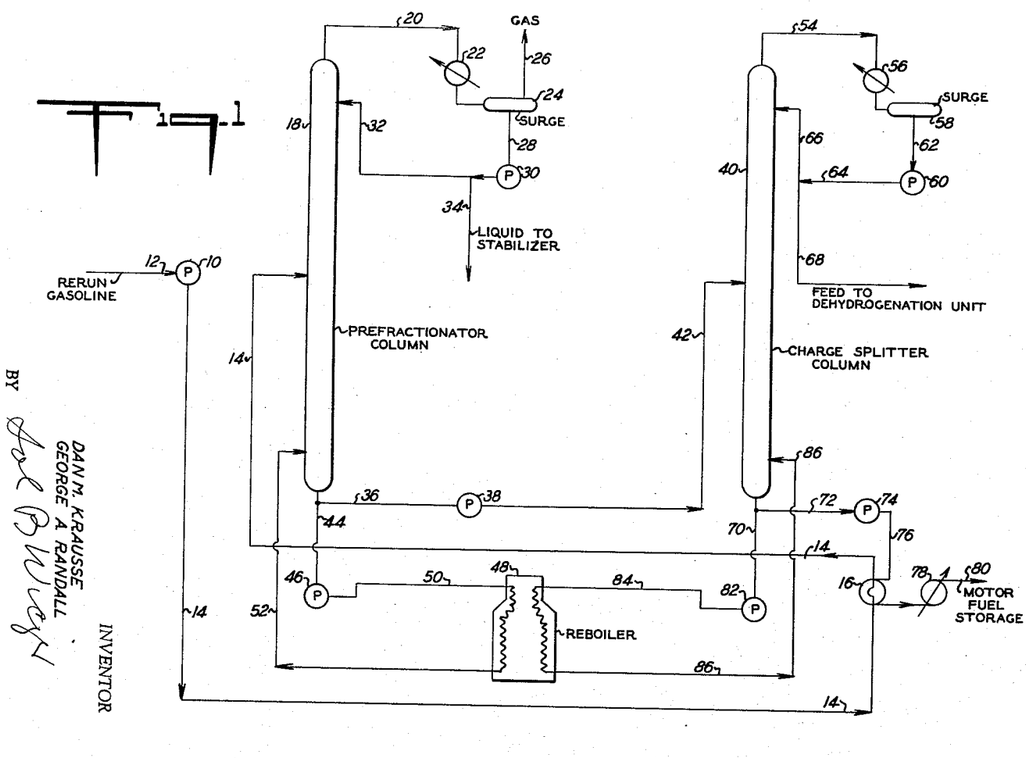
Fig. 1 illustrates digrammatically a feed preparation section.

A portion of the prefractionator bottoms are withdrawn through line 36, by pump 38 and sent to the center of a charge splitter fractionating column 40, by way of line 42. Another portion of the prefractionator bottoms are withdrawn through line 44 by pump 46 and passed through a reboiler 48 by way of line 50, and returned as a hot vaporous mixture to the bottom of the prefractionator column, by way of line 52.

The charge splitter column 40 is operated to pass overhead vapors by way of line 54 at a temperature boiling in the useful feed stock fraction range, that is, below the end point of about 400° F. The desired overhead vapors are condensed to liquid by heat exchanger 56, passing to surge drum 58, from which it is withdrawn by pump 60 by way of line 62, and passed through line 64. The distillate in line 64 is divided, a portion being returned by way of line 66 to the top of the charge splitter column 40 as reflux, and the remainder sent through line 68 as the desired raw feed stock to be fed to the catalytic dehydrogenation unit illustrated in Fig. 2.

The charge splitter bottoms are withdrawn from the bottom of the column 40, a portion being drawn through line 72, by pump 74, and sent through heat exchanger 16, by way of line 76, and then through a cooler 78, finally passing out of the system, such as to storage, by way of line 80. Another portion of the bottoms drawn through line 70 by pump 82 is passed through reboiler 48, by way of line 84, and returned to the lower end of charge splitter column 40 by way of line 86 as a hot vaporous mixture to effect the distillation in column 40.

The charge formed passing through line 68 has been adjusted to the boiling point range of 100 to 400° F., preferably a narrower range such as 150 to 310° F. It will contain at least 25% of naphthenes, preferably substantially higher, up to about 60%. It may contain a few percent of aromatics, usually not more than 15%, and the remainder is substantially paraffins. The following table illustrates a useful range as well as a practical preferred range of feed stock characteristics:

TABLE C

*Feed stock to catalytic dehydrogenator*

| | Useful Range | Preferred Range |
|---|---|---|
| Gravity, °API at 60° F | 58–60 | 58–60 |
| Initial Boiling Pt., ° F | 100–175 | 150–170 |
| 10%, ° F | 160–200 | 170–190 |
| 50%, ° F | 210–300 | 210–220 |
| 90%, ° F | 240–350 | 240–250 |
| End Point, ° F | 285–400 | 285–310 |
| Vol. Percent Paraffins | 25–75 | 43–55 |
| Vol. Percent Naphthenes | 25–60 | 35–55 |
| Vol. Percent Aromatic | 0–15 | 8–13 |

Of this feed stock, the hydrocarbon that typically forms the benzene in the catalytic dehydrogenation product boils in the range of 150–185° F.; the hydrocarbon which forms toluene boils in the range of 185 to 226° F.; hydrocarbon which forms ethylbenzene and isomeric xylenes boil in the range of 226–273° F.; and the hydrocarbon which forms $C_9+$ aromatics boils in the range of 273–400° F. For present purposes, to form ethylbenzene, it will be apparent that the feed stock has as its preferred components, naphthenic hydrocarbon boiling in the range of 226 to 273° F. Thus, the feed stock passing through line 68 in the feed preparation section, may have been adjusted to the boiling range of 226 to 273° F., or the wider range feed stock such as 100 to 400° F., as described in the operation of Fig. 1 may be used; or this wide boiling range stock may be further enriched with naphthenic hydrocarbon boiling in the range of 226 to 273° F. It is accordingly possible not only to produce the high ethylbenzene content $C_8$ aromatic fraction by catalytic dehydrogenation of a selected feed stock, but also control the quantity and type of other aromatics that may be produced simultaneously as by-product for enhancing over-all economy of the process by judicious enrichment of the feed stock with desired boiling range naphthenic hydrocarbon.

Figure 2:
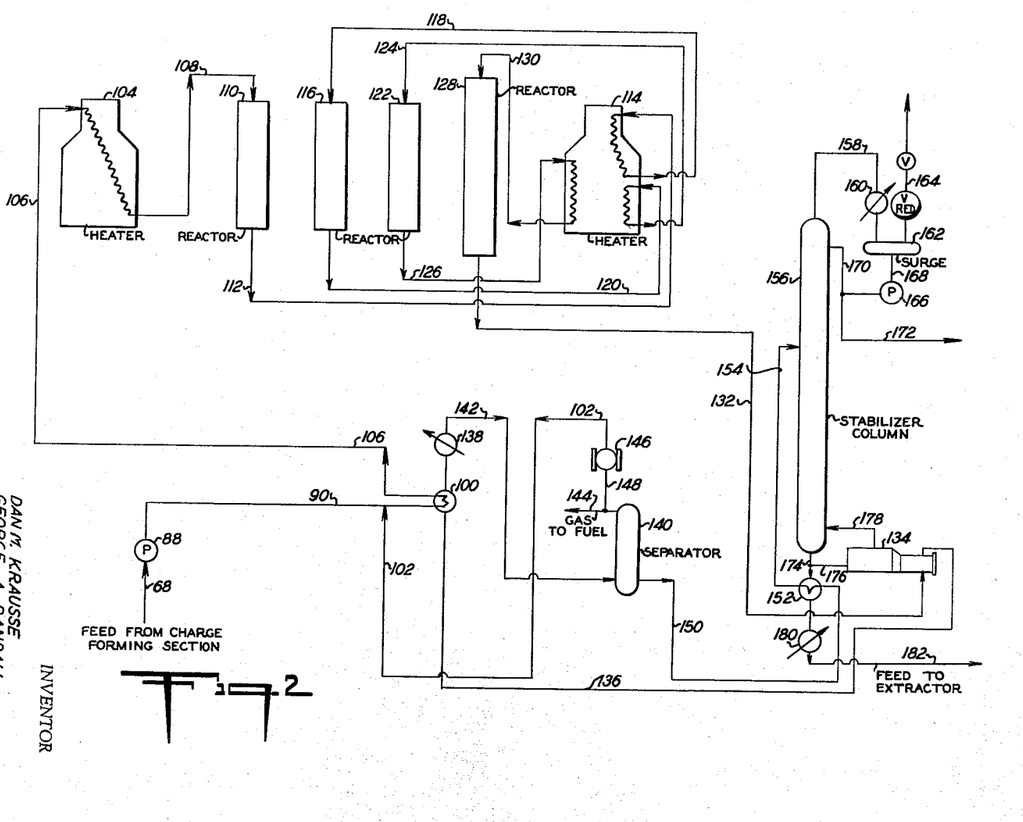
Fig. 2 illustrates a catalytic dehydrogenation-aromatizer unit.

Referring to Fig. 2, the selected raw feed stock from line 68, under pressure of pump 88, passes through line 90 together with hydrogen from line 102 supplied in proportion of from 4–12 mols, preferably 6 to 8 mols, of hydrogen per mol of hydrocarbon, through heat exchanger 100 to heater 104 by way of line 106. The heater 104 heats the hydrocarbon to the range of about 850–975° F., preferably 910–930° F., to a pressure of 200–500 p.s.i.g., preferably 420–460 p.s.i.g., and the hot vaporous charge is passed by way of line 108, to the first reactor 110, in which the vaporized charge is contacted with a dehydrogenation catalyst, usually platinum. The reaction is endothermic, the charge being cooled substantially as the product becomes dehydrogenated to form aromatics. The vapors are withdrawn from the bottom of the reactor 110 through line 112 and sent to reheater 114, returning after reheating to the desired reaction temperature to a second reactor 116, by way of line 118. The second stage reaction product withdrawn from the bottom of reactor 116 is again passed to reheater 114, by way of line 120, and returned after reheating to the top of the third reactor 122, by way of line 124. The third stage reaction mixture withdrawn from the bottom of reactor 122, is again heated in reheater 114, by way of line 126 and sent to the fourth stage reactor 128, by way of line 130.

The fourth stage reaction mixture withdrawn from the bottom of reactor 128, by way of line 132, is sent through heat exchanger reboiler 134 and then through heat exchanger 100, by way of line 136, is cooled in a second heat exchanger 138 to condense liquids and sent to a gas and liquid separator 140, by way of line 142. A portion of the uncondensed vapors, mostly hydrogen, are withdrawn from the system through vapor line 144 and a remaining portion sent to a compressor 146 by way of line 148, to recompress the gases, mostly hydrogen, to reaction pressure of about 200 to 500 p.s.i.g., preferably 420 to 460 p.s.i.g., returning the same to the raw incoming feed stock, passing through line 90, by way of line 102.

The condensed liquid reaction product is withdrawn from separator 140, by way of line 150, passing through heat exchanger 152 and thence, by way of line 154, is passed to an intermediate point in a stabilizer column 156. In the stabilizer column, overhead vapors comprising volatile hydrocarbon boiling below the approximate range of 200 to 210° F., under a pressure of 150–200 p.s.i.g. are taken off through line 158, cooled substantially to condense a substantial portion to liquid in cooler 160, and then separated from uncondensed gases in the surge drum 162, the vapors being withdrawn through line 164 by way of pressure regulating valve 163. The liquid is withdrawn from surge drum 162 by pump 166, by way of line 168, and a portion is sent to the top of the stabilizer column as reflux by way of line 170, and a portion is withdrawn as light overhead distillate and sent to storage by way of line 172. The aromatized bottoms from the stabilizer column 156 are withdrawn by way of line 174, and a portion is sent by way of line 176 to reboiler 134 and returned as a hot vaporous mixture to the bottom of the stabilizer column through line 178. The remaining portion of stabilizer bottoms from line 174 are passed through heat exchanger 152 and then, after cooling in exchanger 180, are sent to storage by way of line 182.

In the catalytic dehydrogenation aromatizer section 25–60%, usually 45–53%, of the raw feed stock after stabilizing comprises aromatic hydrocarbon. The following Table D illustrates a useful as well as a preferred range of operating conditions in the catalytic dehydrogenation section:

TABLE D

*Operating conditions dehydrogenation section*

| Equipment | Temperature, ° F. | | Pressure, p.s.i.g. | |
|---|---|---|---|---|
| | Useful Range | Preferred Range | Useful Range | Preferred Range |
| Inlet No. 1 Reactor | 890–975 | 910–930 | 200–500 | 420–460 |
| Outlet No. 1 Reactor | 810–925 | 810–860 | | |
| Inlet No. 2 Reactor | 890–975 | 910–930 | | |
| Outlet No. 2 Reactor | 810–925 | 845–870 | | |
| Inlet No. 3 Reactor | 890–975 | 910–930 | | |
| Outlet No. 3 Reactor | 810–925 | 875–905 | | |
| Inlet No. 4 Reactor | 890–975 | 910–930 | | |
| Outlet No. 4 Reactor | 810–950 | 890–920 | 150–500 | 320–380 |
| Separator | 35–135 | 80–105 | 100–450 | 300–360 |
| Stabilizer Column: | | | | |
| Top | 190–250 | 200–210 | 100–250 | 120–200 |
| Bottom | 350–450 | 400–420 | 100–250 | 120–200 |

| | Useful Range | Preferred Range |
|---|---|---|
| Hydrogen to Hydrocarbon—Ratio | 4–12 | 6–8 |
| Yield: | | |
| Total Dehydrogenation Product, Weight Percent | 75–90 | 80–90 |
| Hydrogen Gas, Weight Percent | 4–6 | 4–6 |
| Stabilizer O'head Liquid, Wt. Percent | 5–12 | 5–12 |
| Stabilizer O'head Gas, Wt. Percent | 0.2–1.0 | 0.2–1.0 |

The catalytic dehydrogenation products obtained under the conditions set forth in Table D have the following characteristics after stabilizing. B.P. range 140–340° F., vol. percent paraffin 35–65, vol. percent naphthene 3–10, vol. percent aromatic 25–60. The ethylbenzene obtained from the $C_8$ aromatics contained therein ranges from 27 to 34% of the $C_8$ fraction. As stated above, similar ethylbenzene containing naphthas from other sources may be used as feed stock to the extractor. Since this catalytic dehydrogenation produces such high ethylbenzene content in the $C_8$ aromatics, it is a preferred feed stock to the extractor.

The preferred extraction unit, here described, is designed for operation at raised temperatures, typically in the range of 220–325° F., preferably in the range of 280–300° F., and pressure in the range of 80 to 135 p.s.i.g., preferably 125–130 p.s.i.g. Under these conditions the lower alkylene glycol ethers are the most useful solvents, and we use, typically, diethylene glycol or dipropylene glycol or mixtures thereof, with small quantities, up to about 12%, preferably 5 to 10%, of water. When other solvents are used the system may be operated at lower or higher temperatures variable with the physical, such as the boiling point characteristics of the particular solvent.

Figure 3:
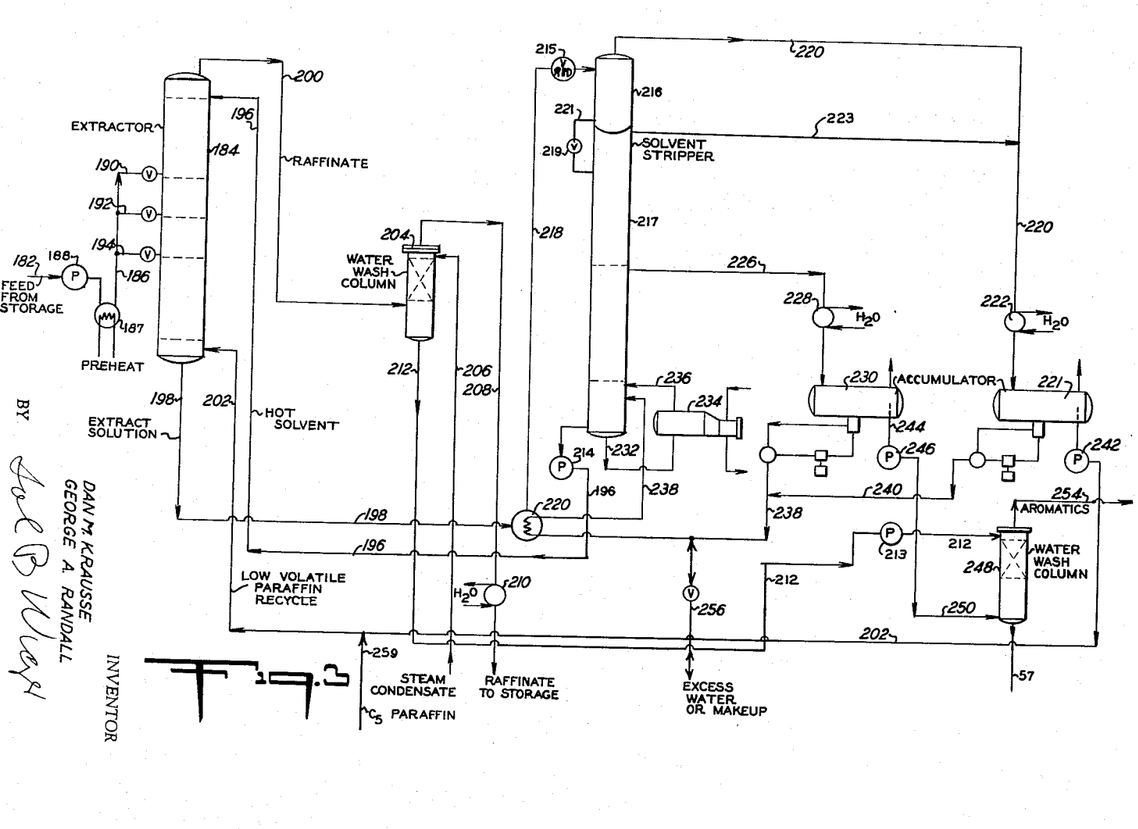
Fig. 3 illustrates an extraction section.

In operation of such system, as illustrated in Fig. 3, the feed from storage, for example, the stabilized catalytic dehydrogenated product obtained as illustrated in Fig. 2, or other useful ethylbenzene containing feed stock as described, enters the extraction system through line 182 and is passed by pump 188, first through heat exchanger 187 to preheat the feed to a desired extraction temperature, such as 280–300° F., and thence, by way of line 186 to some preselected intermediate level of the extractor 184, such as through pipes 190, 192 or 194, and at a pressure such as from about 125 to 130 p.s.i.g. at which the system is operating.

Hot solvent at a similar temperature and pressure enters the top of extractor 184 through line 196 in preferred ratio of about 10–15 parts of solvent to about 1 of hydrocarbon feed. Simultaneously a light hydrocarbon reflux, typically a paraffinic refinery cut, is supplied to the bottom of the extractor 184 through line 202, the $C_5$ hydrocarbon being generally obtained as recycle from the stripper as explained further below. That paraffinic recycle in line 202 is supplied at about 1½ to 4½ % of the solvent rate. The solvent and mostly dissolved aromatic hydrocarbon, with some lesser quantity of non-aromatic components, descend through the column as the extraction proceeds, so that an aromatic rich solvent solution concentrates at the bottom of the extractor 184, and an aromatics poor raffinate hydrocarbon ascends to the top of the extractor 184. The aromatics rich solvent solution is continuously washed by the light paraffinic $C_5$ hydrocarbon recycle from line 202, which tends to displace from the extract solution as a continuous wash, the heavier non-aromatics dissolved therein, replacing the same with the lighter $C_5$ hydrocarbon. Thus, the extract solution withdrawn from the extractor 184 through line 198 from which higher boiling non-aromatic hydrocarbon has been replaced by the lighter $C_5$ non-aromatic hydrocarbon of the recycle is substantially aromatic. The raffinate, as produced in the extraction, and taken off overhead through line 200, contains some of the undissolved recycle $C_5$ hydrocarbon together with the heavier displaced non-aromatic hydrocarbon from the extract, as well as the unextracted hydrocarbon remaining after contact of the raw feed with the solvent. That raffinate may further contain a small quantity of unextracted aromatic hydrocarbon.

The raffinate in line 200 is passed to a point near the bottom of water wash column 204, and the raffinate hydrocarbon introduced therein rises countercurrently to a supply of wash water introduced near the top of the column 204 by way of line 206. The washed raffinate is withdrawn from a point near the top of column 204 through line 208 and sent to raffinate storage after cooling in a heat exchanger 210. The wash water, together with small quantities of solvent removed from the raffinate, after descending to the bottom of the water wash column 204, is withdrawn through line 212, and sent to the top of an aromatics extract wash column 248, as impelled by a pump 213.

The hot aromatics rich extract solution in the solvent, withdrawn from the bottom of extractor 184 through line 198, is first cooled to the range of 215–250° F., preferably 225–240° F., in heat exchanger 220, and then sent by way of line 218 to a point near the top of a solvent stripper section 216 by way of pressure reducing valve 215. In the solvent stripper 216, by reduction of pressures to below about 50 p.s.i.g., preferably to about 10–20 p.s.i.g., the volatile non-aromatic hydrocarbon (dissolved $C_5$ paraffin) components flash overhead as vapors through line 220, and the unvolatilized solvent solution of aromatics collecting in the bottom of the flashing section 216, are transferred by way of a float controlled valve 219 through line 221 to a point near the top of a solvent stripper section 217.

In the solvent stripper section 217 all of the aromatics and any of the residual non-aromatics which were not removed in the flashing applied in flashing section 216, are stripped from the bottom of the solvent stripper, a portion of the steam being obtained through line 238 by distillation in heat exchanger 220, and another portion from reboiled solvent heated in the boiler 234, and returned to the bottom of the stripper through line 236. Thus, the stripping in effect, is a semi-steam type stripping, obtained by passage of steam into the bottom of the stripper. At the top of the stripper any of the more volatile residual generally non-aromatic $C_5$ hydrocarbon is first vaporized and then passed overhead through line 223. Some of the more volatile aromatics are also allowed to pass overhead together with a substantial quantity of steam through line 223, and that overhead product in line 223 is rejoined with the non-aromatic hydrocarbon passing through line 220 as originally flashed from the solvent solution, and both components are cooled in heat exchanger 222 to condense them to liquid and passed to accumulator 224.

Since the non-aromatic hydrocarbons are the most volatile they are efficiently removed from the top of the column through line 223 together with about 5–10% of the most volatile aromatics, and the substantially 100% pure aromatic streams may be taken off of the stripper column 217 as a side stream through line 226, together with some steam. This mixture is cooled in heat exchanger 228 to condense the aromatics to liquid and passed to accumulator 230 together with small quantities of steam condensed to water therewith.

A portion of the solvent accumulating in the bottom of the stripper is withdrawn through line 232, passed to reboiler 234 and returned as a vaporous mixture to the bottom of the column through line 236 to supply the heat for stripping, and concentrate the solvent to contain the desired quantity of water. The remainder of the solvent is continuously withdrawn from the bottom of the stripper through line 196 by pump 214 and returned to the top of the extractor.

Figure 4:
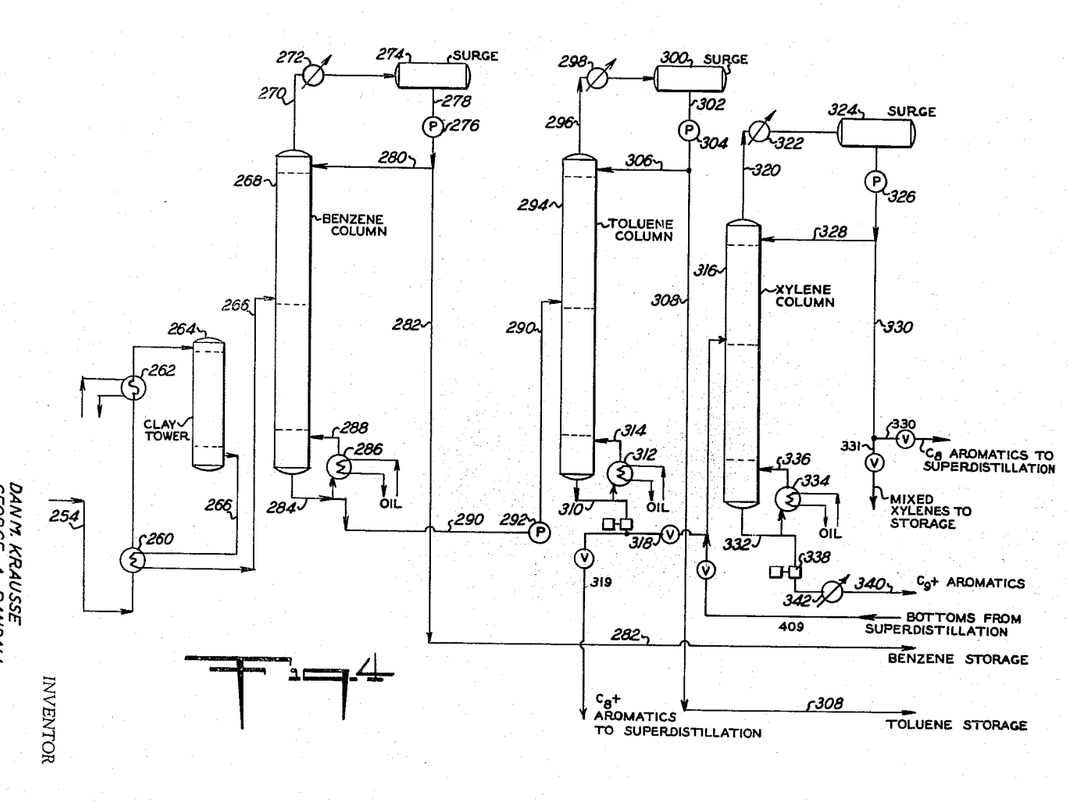
Fig. 4 illustrates a benzene, toluene and mixed xylene distillation unit.

The accumulator tank 230, in which the stripped aromatics are collected, has the aromatics withdrawn therefrom by a take-off pipe 244, which passes the accumulated aromatics by way of line 250, as impelled by pump 246, to a point near the bottom of a water wash column 248. The aromatic hydrocarbon rises countercurrently in column 248 to water supplied to a point near the top thereof from line 212. The washed aromatics are withdrawn from the top of the water wash column 248 through line 254 for further processing as illustrated in Fig. 4.

Some water accumulating in a sump below the bottom of accumulator 224 is withdrawn through line 240 and sent to line 238 and returned to stripper 217 after first being vaporized to steam in exchanger 220, thereby furnishing additional steam for the semi-steam stripping operation.

The volatile hydrocarbon flashed overhead in flash column 216 and overhead from the top of stripping column 217, by way of line 220 and 223 to comprise mostly $C_5$ hydrocarbon with about 5–10% of more volatile aromatics, is removed from accumulator 224 from pump 242, and passed as continuous recycle to the bottom of the extractor 184 by way of line 202. From time to time additional paraffinic $C_5$ hydrocarbon may be supplied to the system by way of line 259 to pass the same into line 202 as needed.

Any excess water or deficiency of water is withdrawn or supplied to the system by way of line 256 connecting with line 238. Wash water accumulated in the bottom of wash column 248 is withdrawn from the system by way of line 257.

The useful range as well as preferred operating characteristics of the solvent extraction system, illustrated in Fig. 3, are summarized in Table E:

TABLE E

Operating conditions of glycol ether extraction system

|  | Useful Range | Preferred Range |
| --- | --- | --- |
| Extractor Temperature, ° F | 220–325 | 280–300 |
| Extractor Pressure, p.s.i.g | 80–135 | 125–130 |
| Stripper Bottom Temperature, ° F | 250–325 | 280–300 |
| Stripper Top Temperature, ° F | 215–250 | 225–240 |
| Stripper Flash Pressure, p.s.i.g | 0–50 | 10–20 |
| Stripper Bottom Pressure, p.s.i.g | 0–25 | 5–10 |
| Clay Tower Inlet Temp., ° F | 400–450 | 425 |
| Clay Tower Inlet Pressure, p.s.i.g | 100–225 | 150–200 |
| Clay Tower Outlet Pressure, p.s.i.g | 90–200 | 130–170 |
| Recycle composition: |  |  |
| $C_5$ Paraffin | 70–100 | 75–90 |
| $C_6$ Paraffin | 0–20 | 1–10 |
| $C_4$ Paraffin | 0–20 | 1–10 |
| Aromatic | 0–10 | 5–10 |
| Solvent Composition: |  |  |
| Wt. Percent Water | 2–12 | 5–10 |
| Wt. Percent Diethylene glycol | 65–98 | 68–95 |
| Wt. Percent Dipropylene glycol | 0–33 | 0–25 |
| Raffinate: |  |  |
| Gravity, °API at 60° F | 67–73 | 67–73 |
| Volume Percent Paraffins | 80–95 | 80–95 |
| Volume Percent Naphthenes | 2–12 | 0–5 |
| Volume Percent Aromatics | 0–10 | 0–3 |

Referring to Fig. 4, washed solvent free aromatic extract passing through line 254, with or without intermediate storage, is preheated to heat exchanger 260 and further heated by heater 262 and sent through a clay treating tower 264 to remove slight quantities of impurities such as traces of color forming bodies. The clay treated extract leaves the clay tower through line 266 and, after passing through heat exchanger 260, is sent to a benzene distillation column 268. The benzene vapors passing overhead through line 270 are cooled in condenser 272. The condensate accumulates in the surge drum 274 from which it is withdrawn by pump 276, by way of line 278, and a large portion is returned to the top of the column through line 280 as reflux, and a product portion is withdrawn to storage as benzene by way of line 282. For production of reagent grade benzene, a column of at least 12, preferably 35 to 45 stages or plates are used with a minimum reflux ratio of 1.35:1, preferably 5 to 7:1 is used, whereby benzene of a purity of 0.5–1° C. boiling range may be obtained. The benzene distillation column bottoms are withdrawn through line 284, a portion being passed to reboiler 286, and returned to the still after heating through line 288, and a portion sent through line 290, as impelled by a pump 292 and passed to a toluene distillation column 294.

The overhead vapors of the toluene column 294, passing through line 296 are condensed by condenser 298 and accumulated in surge drum 300. A portion of the condensate withdrawn through line 302 by pump 304 is returned to the top of column 294 through line 306 as reflux, and a portion of the toluene product is sent to storage through line 308. Again, by maintaining a minimum reflux ratio of 1.0:1, preferably 2.0–4.0:1, and using a column of at least 14, preferably 35 to 45 stages or plates, a nitration grade toluene having a distillation range of 1° C. or less may be produced. The toluene column 294 bottoms, withdrawn through line 310 has a portion passed to reboiler 312 and returned to the column through line 314 and a portion is sent to a xylene distillation column 316, by way of line 318; or alternatively is sent by way of by-pass line 319 directly to superdistillation of Fig. 5 described below.

Figure 5:
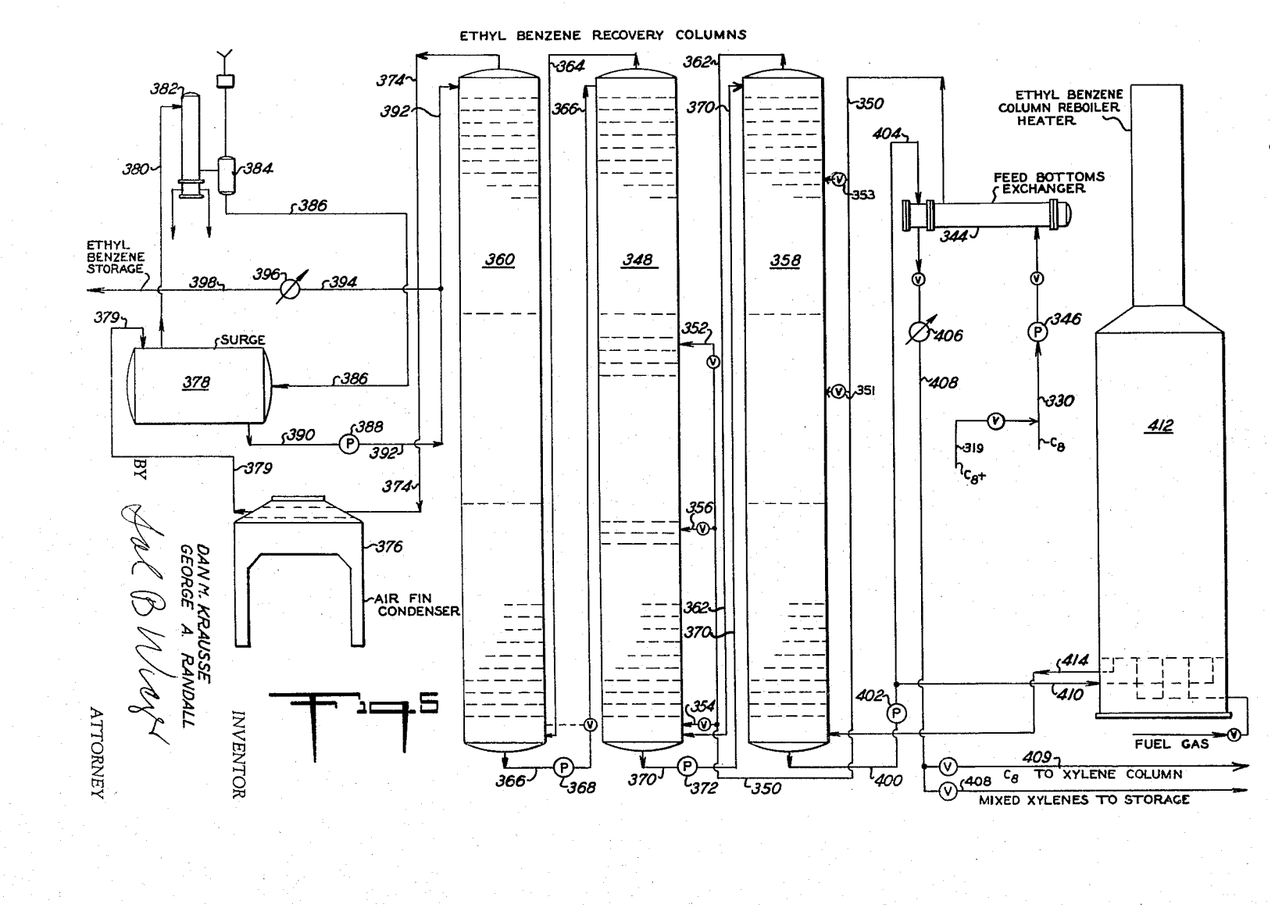
Fig. 5 illustrates a super-distillation unit to separate ethylbenzene.

The $C_8$ vapors taken overhead through line 320 from the column 316 in a temperature range of 130 to 140° C. are condensed by condenser 322 and passed to surge drum 324, of which a portion is returned by pump 326 to the top of the column 316 by way of line 328 as reflux, and a portion is sent to the superfractionation column Fig. 5 via storage. The $C_9$ bottoms, withdrawn from the bottom of the xylene column 316 through line 332 has a portion passed through reboiler 334, from which a vaporous mixture is returned through line 336, and a portion is sent by pump 338 to $C_9+$ bottoms storage by way of line 340 after cooling in exchanger 342. The xylene column 316 has at least 10, preferably 25–35 stages or plates, operating at a reflux ratio of at least 0.15:1, preferably 0.3 to 0.5:1. In this $C_8$ product distillation, the overhead product has a distillation range of about 4–10° C.

The $C_8$ overhead, when operating on the narrow range feed stock to the catalytic dehydrogenator, as defined in "Table C" above will comprise about 0–10% toluene, about 27–34% ethylbenzene and the remainder, mixed xylene isomers, of which the metaxylene is present in predominant portion, about twice that of either of the other xylenes, the para and ortho being in about equal quantities. The mixed $C_8$ overhead, passed to the ethylbenzene recovery section shown in Fig. 5, is substantially 100% aromatic and usually contains less than 0.05% non-aromatics, well below the critical 0.3% limit. This raw feed stock enters the ethylbenzene recovery system in Fig. 5 through line 330 either directly as leaving the xylene column of Fig. 4 or after intermediate storage.

In an alternate procedure the ethylbenzene may be removed directly by superdistilling the $C_8+$ bottoms following toluene removal in column 294. Small quantities of toluene boiling much lower than the $C_8$ aromatics do not interfere with the separation and can be tolerated in reasonable quantities. As being substantially more volatile than either ethylbenzene or styrene, it is simply distilled from the ethylbenzene or a subsequent mixture with styrene. In fact, in the direct dehydrogenation of the ethylbenzene produced, some toluene is usually produced with the styrene so that toluene may be removed even at the later stage, such as when separating undehydrogenated ethylbenzene admixed with styrene in the styrene production. Generally, when operating the toluene column within the preferred limits above stated, the $C_8+$ fraction removed from the bottom thereof will not contain more than 1–2% of toluene. Of course, a wider range toluene can be distilled from the toluene column, thereby removing all of the toluene from the $C_8+$ residue, but it is preferred to operate the toluene column to produce a pure toluene product as described, leaving a few percent of toluene in the $C_8$ plus bottoms. It is possible, accordingly, in an alternate procedure to pass the $C_8+$ bottoms, directly from the toluene column by way of line 319 to the superdistillation unit of Fig. 5; and the residual $C_8$ xylene isomers together with bottoms from that superdistillation, may be returned by way of line 409 as feed to the xylene column 316. That feed contains substantially no ethylbenzene, whereby the column 316 removed only the mixed xylene from the $C_9+$ hydrocarbon. When operating in this manner the xylene as net overhead product of column 316 passing through line 330, are sent by way of line 331 to mixed xylene storage.

As shown in Fig. 5 the $C_8$, or $C_8+$ fraction, respectively obtained either from lines 330 or 319, depending upon whether the feed is after or before distillation in xylene column 316, is sent first through heat exchanger 344 wherein the temperature is raised usually sufficient to volatilize some of the $C_8$ aromatics at any positive feed pressure established by pump 346 to overcome the head pressure of the column at the selected point of entry. Upon heating the heat exchanger 344, the raw feed may be passed to any of several points of either of the distillation columns 348 or 358, by way of line 350, such as to the bottom of the column 348 by way of line 354, to a higher intermediate point through line 356, to a still higher point 352 of column 348, or it may be passed to the center or top of the first column 358 of the series, through line 351 or 353.

The superdistillation in total is effected in a plurality of two, three or more columns, shown here as three columns 348, 358 or 360, using more than 150 plates, such as 200 to 400 plates as preferred, and dividing the same into three columns. Each column as shown, will preferably have from 66 to about 134 plates or stages. The vapors passing overhead from column 358 are introduced at the bottom of the intermediate column 348 by way of line 362, and the vapors passing overhead from colum 348 are introduced to the bottom of the column 360 by way of line 364. Simultaneously, the liquid collected as bottoms in column 360 is returned to a point near the top of the preceding column 348 by way of line 366, as impelled by pump 368. The liquid bottoms of column 348 is returned to a point near the top of column 358 by way of line 370, as impelled by pump 372. In this manner one continuous distillation is effected as shown in three separate columns, each having from 66 to 134 plates, whereby the net distilling effect is that of a single column having over 150 and preferably over 200 plates.

The overhead vapors leaving still 360 by way of line 374 are passed through a condenser, preferably an air cooled condenser and to a surge drum 378. Any uncondensed vapors are vented by way of line 380 to a heat exchanger 382 to condense more of the vapors, the cooled liquid and vapor mixture being passed through a vent separator 384 to separate uncondensed vapors, the condensate being returned by way of line 386 to the surge drum 378. Accordingly, the surge drum 378 combined with the vapor condensing unit 382, operates as a refluxing condenser to condense vapors for the surge drum and return the same as condensed liquid to the drum 378 in relatively small quantities, whereby the liquified distillate in drum 378 is maintained as liquid, but only slightly below its boiling point. The hot liquid is withdrawn from the drum 378 by pump 388 by way of line 390 and a large portion at least 40 to 1, preferably 60 to 150:1 of the hot liquid is returned to the top of the final distillation column 360 by way of line 392, as reflux, and a portion passes by way of line 394, through cooler 396, and thence to ethylbenzene storage by way of line 398.

The liquid bottoms from the first column 358 are withdrawn through line 400 as impelled by pump 402, and a portion passes by way of line 404 through heat exchanger 344 and, after cooling further in cooler 406, is withdrawn by way of line 408. Another portion of the bottoms of column 358 in line 404 is passed through line 410 and thence into a reboiler 412, and the hot vaporous reboiler mixture is returned to the lower end of still 358 by way of line 414. In operation of this section, the heated charge introduced to a selected point of one of the columns, such as the mid-point of column 348 under pressure of pump 346, after mixture with vapors also introduced to the bottom from line 362 produced by reboiler 412, will produce liquid bottoms in line 370 which is returned to the top of column 358 as reflux. The bottoms of column 358 after being reboiled in boiler 412 are returned to the bottom of column 358 as a vaporous mixture at a temperature sufficient to volatilize ethylbenzene. The liquid at the bottom of column 360 in similar manner is pumped to the top of column 348 by pump 368. Finally the hot condensed overhead is returned in part to the top of column 360 according to the critical reflux ratio exceeding 40:1.

Where the raw feed enters the system of Fig. 5 by way of line 330 after removal of $C_9+$ bottoms in column 316, the bottoms product in line 408 consists of mixed xylenes and may be sent to storage as relatively pure xylenes. Where the feed enters through line 319 as the bottoms product of the toluene column 294, then the product in line 408 is returned to the xylene column 316 by way of line 409 to separate pure mixed xylenes as overhead from the $C_9+$, which are then sent to storage by way of line 331.

The following examples illustrate the practice of this invention:

*Example I.*—A naphthenic feed stock is stabilized as described by Fig. 1 to a boiling point range of 156–300° F. The stock has a 10% boiling point of 180° F., a 50% boiling point of 212° F. and a 90% boiling point of 244° F. and produces 50% over at 212° F., the naphtha analyzing 48% paraffins, 42% naphthenes of which 31% boiled above 226° F., and 10% aromatics. It is passed to a first reactor of a series of four containing platinum suspended on a carrier at a temperature of 915° F. and pressure of 430 p.s.i.g. with a hydrogen to hydrocarbon ratio of 7.5 to 1 molar. It was continuously reheated in passage through the series of reactors, each time to the initial temperature of 915° F., the final outlet temperature being 895° F. and the pressure 325 p.s.i.g. It was stabilized in the stabilizer as illustrated in Fig. 2, the top temperature being maintained at 205 ° F. and the bottom at 415° F. at a pressure of 160 p.s.ig. The total catalytic dehydrogenation product yield was 87.5% together with 5 weight percent hydrogen gas and 7.5 percent of gas and liquid stabilizer overhead. The product comprised 45% paraffins, 6% naphthene, and 49% aromatics. It was sent to an extractor system illustrated in Fig. 3, operating in a ratio of 12 parts of solvent to 1 part of hydrocarbon feed with a recycle of 0.35 part of recycle consisting of 90 vol. percent $C_5$ paraffin, 7 vol. percent aromatics, 1 vol. percent $C_4$ paraffin and 2 vol. percent $C_6$ paraffin. The solvent composition consisted of 7% water, 73% diethylene glycol and 20% dipropylene glycol by volume. The raffinate composition was 85% paraffin, 9% naphthene and 6% aromatics. The stripped aromatics was washed with water and clay treated at 425° F. It was then distilled in a benzene column having 40 plates operating at a reflux ratio of 7 to 1 to produce benzene having a distillation range of 0.7° C., a freezing point of 5.39° C. and sp. gr. at 60° F. of 0.884. The bottoms of the benzene distillation were distilled in a toluene column having a reflux ratio of 2.7 to 1 to produce toluene having a distillation range of 0.8° C. and sp. gr. at 60° F. of 0.872. The bottoms of the toluene column were sent to a xylene column having 30 plates operating at a reflux ratio of 0.4 to 1 to produce mixed $C_8$ aromatics having a boiling point range of 6° C. The $C_8$ aromatics fraction taken overhead analyzed 1.5% toluene, 28.8% ethylbenzene, 16.0% p-xylene, 37.3% m-xylene and 16.4% o-xylene by weight with no analyzable quantity of non-aromatic hydrocarbon boiling in the range of 130–140° F. The $C_8$ fraction was then sent to a three column still for superdistillation as illustrated in Fig. 5, each column having 130 plates or a total of 390, and distilled at a reflux ratio of 87 to 1. The overhead product consisted of pure ethylbenzene containing 4.5% toluene. That toluene did not need to be removed, but the product was directly useful for styrene production. In a further distillation merely to remove toluene, the residual ethylbenzene recovered was 99.995% pure.

*Example II.*—A naphthenic feed stock is adjusted to a boiling range of 226–273° F. and analyzed to contain 58% naphthenes, 7% aromatics and 35% paraffins. It is catalytically dehydrogenated as illustrated in Fig. 2 at an average inlet temperature of 930° F. and a pressure of 445 p.s.i.g. with a hydrogen to hydrocarbon ratio of 8.0 to 1. It was continuously reheated in passage through the series of reactors to the initial temperature and had a final outlet temperature of 905° F. at a pressure of 334 p.s.i.g. The yield was 86%, the balance being light overhead liquid gases and hydrogen. The product comprises 59.5% aromatics, 8% napthenes and the balance paraffins. The extracted aromatics as illustrated in Fig. 3 after removal of benzene and toluene to form a 5° C. boiling point range $C_8$ aromatics fraction was superdistilled with a yield of 33% of ethylbenzene having a purity of 99.992% based upon the $C_8$ aromatics after removal of toluene.

*Example III.*—The method of Example I was repeated under exactly the same conditions except that the feed stock to the extraction unit consisted of a virgin gasoline fraction obtained from an aromatic base oil having a boiling point range of 140–340° F. The ethylbenzene obtained in the final superdistillation consisted of 15% of the total $C_8$ aromatics fed to the still, and after further removal of the toluene, the ethylbenzene had a purity of 99.995%.

*Example IV.*—The conditions of Example I were repeated using as feed stock a cracked gasoline reacted at 850° F. in two passes over an alumina catalyst. It was fractionated to the same boiling point range as in Example II and extracted, all conditions being the same throughout as in Example I. 13% of the $C_8$ fraction fed to a superdistillation unit was recovered as ethylbenzene having a purity of 99.990% after further removal of toluene.

Thus, as herein set forth in detail, ethylbenzene may be commercially obtained from aromatized, preferably a catalytically dehydrogenated naphtha having at least 25% naphthene content in the raw feed stock, using a ratio of at least 4 to 12 times the hydrocarbon content of hydrogen to produce an aromatized product containing from 40–60% aromatics. The $C_8$ aromatic fraction will contain at least 15% of ethylbenzene which can be recovered in a superdistillation applied in a still comprising over 150 plates at a reflux ratio exceeding 40:1, providing the $C_8$ aromatic feed is substantially free of stable non-aromatic hydrocarbon boiling in the range of 130 to 140° C. Such pure aromatic fraction becomes practically available by extraction wherein the critical non-aromatics boiling in this range are displaced by lower boiling non-aromatics. The high content of ethylbenzene in the $C_8$ fraction obtained from catalytic dehydrogenation is in itself surprising since neither virgin gasolines or other catalytic naphthas generally contain such high quantities of ethylbenzene among the $C_8$ aromatics as become available following the specific procedure set forth herein. Thus, while ethylbenzene may be distilled from a xylene mixture therewith from any source in the superdistillation hereof, providing the mixture is first freed of any stable non-aromatic hydrocarbon exceeding 0.3 weight percent thereof, the production of ethylbenzene following the preferred aromatizing procedure hereof forms a raw material which contains unusually large economically recoverable quantities.

Thus, any virgin or catalytic naphtha having an economically recoverable quantity of ethylbenzene may, after removing substantially all of the non-aromatics and forming a mixed $C_8$ aromatics fraction containing the ethylbenzene, have the ethylbenzene separated by this superdistillation. Similarly, aromatizing procedures other than one using a platinum type catalyst, may be used providing the aromatization is performed upon a highly naphthenic feed stock, whereby to produce substantial quantities of ethylbenzene in the $C_8$ fraction.

Various modifications will occur to those skilled in the art and accordingly, it is intended that the description

We claim:

1. The method of separating ethylbenzene from a mixture with xylene isomers contained in a hydrocarbon mixture which contains other hydrocarbon components comprising first forming of said hydrocarbon mixture a concentrate fraction of said $C_8$ hydrocarbons from which the stable non-aromatic hydrocarbons boiling in the range of 130 to 140° C. contained in said fraction in quantity greater than 0.3% have been removed, and then superdistilling the ethylbenzene from said fraction in a distillation column having at least 150 distillation stages at a reflux ratio exceeding 40:1.

2. The method of separating ethylbenzene from a mixture with xylene isomers contained in a predominantly $C_8$ hydrocarbon fraction comprising first removing stable non-aromatic hydrocarbons boiling in the range of 130 to 140° C. contained in said fraction in quantity greater than 0.3% and then superdistilling the ethylbenzene from said $C_8$ fraction in a distillation column having from about 200 to 400 distillation stages at a reflux ratio in the range of 60–150:1.

3. The method of recovering ethylbenzene contained in a petroleum hydrocarbon naphtha together with other aromatic hydrocarbons, comprising extracting the aromatic hydrocarbon in said naphtha to produce an aromatic extract containing less than 0.3% of stable non-aromatic hydrocarbons therein, distilling said aromatic extract to remove $C_6$ and $C_7$ aromatic hydrocarbons and produce a $C_8+$ fraction containing ethylbenzene and then superdistilling the ethylbenzene from said $C_8+$ fraction in a distillation column having at least 150 distillation stages at a reflux ratio exceeding 40:1.

4. The method of recovering ethylbenzene contained in a petroleum hydrocarbon naphtha together with other aromatic hydrocarbons comprising extracting said naphtha with a polar solvent having a preferential solubility for aromatic hydrocarbon to form a hydrocarbon solution in said polar solvent in which the aromatic hydrocarbons are predominant, washing said solution with a liquid hydrocarbon having a boiling point range lower than said aromatic hydrocarbon and having a solubility in said solvent greater than the higher boiling non-aromatic hydrocarbon components dissolved in said solvent, thereby displacing said higher boiling non-aromatic hydrocarbons from said solution, separating the aromatic hydrocarbon from other components of said solution by distillation, distilling from said aromatic hydrocarbon mixture a $C_8$ aromatics fraction having less than 0.3% of stable non-aromatic hydrocarbon therein and then superdistilling said $C_8$ aromatic fraction to separate ethylbenzene from other $C_8$ aromatics in a distillation column having at least 150 distillation stages at a reflux ratio exceeding 40:1.

5. The method of producing ethylbenzene comprising catalytically dehydrogenating a petroleum naphtha rich in hydrocarbons having a boiling point in the approximate range of 226–273° F. and comprising at least 25% naphthene hydrocarbon to form a naphtha containing 40 to 60% of aromatics, extracting the aromatic hydrocarbon from said naphtha under conditions to substantially exclude non-aromatic hydrocarbons exceeding 0.3 volume percent thereof, fractionating the aromatic extract to produce a $C_8+$ fraction and then superdistilling said fraction in a still having at least 150 distillation stages at a reflux ratio exceeding 40:1 to separate a distillate comprising ethylbenzene containing less than 1% of stable hydrocarbon impurity boiling in the range of 130 to 140° C.

6. The method of producing ethylbenzene comprising catalytically dehydrogenating a high naphthene petroleum naphtha boiling in the range of 100–400° F. at a temperature in the range of 890–975° F. and a pressure of 200–500 p.s.i.g. in the presence of 4 to 12 mols of hydrogen per mol of hydrocarbon to produce a dehydrogenation product containing 40–60% of aromatic hydrocarbon, extracting said naphtha with a polar solvent having a preferential solubility for aromatic hydrocarbon to form a hydrocarbon solution in said polar solvent in which the aromatic hydrocarbons predominate, washing said solution with a liquid hydrocarbon having a boiling point range lower than said aromatic hydrocarbon and having a solubility in said solvent greater than the higher boiling non-aromatic hydrocarbon components dissolved in said solvent, thereby displacing said higher boiling non-aromatic hydrocarbons from said solution, separating the aromatic hydrocarbon from the other components of said solution by distillation, distilling from the aromatic hydrocarbon mixture a $C_8+$ aromatics fraction having less than 0.3% of stable non-aromatic hydrocarbon therein and then superdistilling said $C_8+$ aromatic fraction to separate ethylbenzene from other $C_8$ aromatic hydrocarbons in a distillation column having at least 150 distillation stages at a reflux ratio exceeding 40:1.

7. The method of producing ethylbenzene of styrene grade of purity comprising aromatizing a petroleum naphtha to produce an aromatic conversion product containing at least 20 percent of ethylbenzene in the $C_8$ aromatic components, extracting the aromatic hydrocarbon from the aromatic conversion product by solvent extraction with a relatively polar solvent in a manner to produce an aromatic extract containing not more than 0.3% of non-aromatic hydrocarbons therein, fractionating the extract to produce a $C_8+$ fraction and superdistilling said $C_8+$ fraction in a still comprising over 300 distillation stages at a reflux ratio in the range of 60 to 80:1 to separate an ethylbenzene containing less than 1 percent of stable non-aromatic hydrocarbon impurity boiling in the range of 130 to 140° C.

8. The method of producing ethylbenzene comprising catalytically dehydrogenating petroleum naphtha boiling in the range of 100–400° F. and containing at least 25% of naphthenes boiling in the range of 226–273° F. at a temperature in the range of 910–930° F. and a pressure of 420–460 p.s.i.g. in the presence of 6 to 8 mols of hydrogen per mol of hydrocarbon to produce a dehydrogenation product containing 40–60% aromatics, extracting said naphtha with a polar solvent having a preferential solubility for aromatic hydrocarbon to form a hydrocarbon solution in said polar solvent in which the aromatic hydrocarbons predominate, washing said solution with a liquid hydrocarbon having a boiling point range lower than said aromatic hydrocarbon and having a solubility in said solvent greater than the higher boiling non-aromatic hydrocarbon components dissolved in said solvent, thereby displacing said higher boiling non-aromatic hydrocarbons from said solution, separating the aromatic hydrocarbon from said other components of said solution by distillation, distilling from the aromatic hydrocarbon mixture a $C_8+$ aromatics fraction having less than 0.3% of stable non-aromatic hydrocarbon therein and then superdistilling said $C_8+$ aromatic fraction to separate ethylbenzene from other $C_8$ aromatics in a distillation column having from 200 to 400 distillation stages at a reflux ratio in the range of 60–150:1.

9. The method of producing ethylbenzene and other aromatic hydrocarbons in a high degree of purity, comprising catalytically dehydrogenating a petroleum naphtha rich in $C_6$–$C_9$ components and containing at least 25 volume percent of naphthenes, to produce a dehydrogenated naphtha comprising 40–60 volume percent of aromatic hydrocarbons, extracting the aromatic hydrocarbon from dehydrogenated naphtha with a polar solvent while displacing non-aromatic hydrocarbons boiling in the range of 130 to 140° C. from said aromatic extract, separating substantially pure benzene from the aromatic extract by fractionally distilling the extract in a column having at least 12 stages at a minimum reflux ratio of 1.35:1, separating substantially pure toluene by fractionally distilling the residue of the benzene distillation in a column of at least 14 stages at a minimum reflux ratio of 1.0:1, separating a $C_8$ fraction from the residue of the toluene distillation, and superdistilling the $C_8$ fraction in a distillation column having at least 150 distillation stages at a reflux ratio exceeding 40:1 to separate ethylbenzene containing less than 1% of non-aromatic hydrocarbon boiling in the range of 130 to 140° C.

10. The method of recovering ethylbenzene contained in a petroleum hydrocarbon naphtha together with other aromatic hydrocarbons comprising extracting said naphtha with a polar solvent having a preferential solubility for aromatic hydrocarbon to form a hydrocarbon solution in said polar solvent in which the aromatic hydrocarbons predominate, washing said solution with a liquid hydrocarbon having a boiling point range lower than said aromatic hydrocarbon and having a solubility in said solvent greater than the higher boiling non-aromatic hydrocarbon components dissolved in said solvent, thereby displacing said higher boiling non-aromatic hydrocarbons from said solution, separating the aromatic hydrocarbon from other components of said solution to produce a mixture of aromatic hydrocarbons containing less than 0.3% of non-aromatic hydrocarbon components, distilling said aromatic hydrocarbon in a first preliminary distillation in a distillation column having from about 35 to 45 stages at a reflux ratio in the range of about 5–7:1 to separate therefrom substantially pure benzene, distilling the residue in a second preliminary distillation in a distillation column having from about 35 to 45 distillation stages at a reflux ratio in the range of about 2–4:1 to separate substantially pure toluene, and superdistilling the $C_8+$ residue in a column having at least 150 distillation stages at a minimum reflux ratio of 40:1 to separate ethylbenzene containing less than 1% of stable hydrocarbon impurity boiling in the range of 130 to 140° C.

11. The method of recovering ethylbenzene contained in a petroleum hydrocarbon naphtha together with other aromatic hydrocarbons comprising extracting said naphtha with a polar solvent having a preferential solubility for aromatic hydrocarbon to form a hydrocarbon solution in said polar solvent in which the aromatic hydrocarbons predominate, washing said solution with a liquid hydrocarbon having a boiling point range lower than said aromatic hydrocarbon and having a solubility in said solvent greater than the higher boiling non-aromatic hydrocarbon components dissolved in said solvent, thereby displacing said higher boiling non-aromatic hydrocarbons from said solution, separating the aromatic hydrocarbon from other components of said solution to produce a mixture of aromatic hydrocarbons containing less than 0.3% of non-aromatic hydrocarbon components, distilling said aromatic hydrocarbon in a first preliminary distillation in a distillation column having from about 35 to 45 stages at a reflux ratio in the range of about 5–7:1 to separate therefrom substantially pure benzene, distilling the residue in a second preliminary distillation in a distillation column having from about 35 to 45 distillation stages at a reflux ratio in the range of about 2–4:1 to separate substantially pure toluene, distilling the $C_8+$ residue in a third preliminary distillation in a column having from 25 to 35 distillation stages at a reflux ratio of about 0.3 to 0.5:1 to separate a $C_8$ fraction having a boiling point range of about 4 to 10° C., and superdistilling said $C_8$ fraction in a column having from 200 to 400 distillation stages at a reflux ratio of 60–150:1 to separate a distillate ethylbenzene containing less than 1% of stable hydrocarbon impurity boiling in the range of 130 to 140° C.

12. Method of recovering ethylbenzene contained in a hydrocarbon naphtha including other aromatic hydrocarbons as well as non-aromatic hydrocarbons comprising extracting said naphtha at a temperature in the range of 220–325° F. at a pressure of 80 to 135 p.s.i.g. with a polar solvent comprising a lower alkylene glycol ether by continuously passing said solvent under said extracting conditions countercurrently in contact with said naphtha in a ratio of 5 to 30 parts of solvent per part of naphtha by volume to produce an aromatics rich extract solution and aromatics poor raffinate, washing said extract solution with liquid $C_5$ paraffin hydrocarbon whereby higher boiling non-aromatic hydrocarbon components dissolved in said solvent are displaced from said extract solution into said raffinate while being replaced by said $C_5$ paraffin hydrocarbon, reducing the pressure of said extract solution to flash off dissolved $C_5$ hydrocarbon components, stripping the aromatic hydrocarbon from the solvent with steam to separate a fraction comprising substantially 100% aromatic hydrocarbon, distilling from said aromatic hydrocarbon mixture a $C_8+$ aromatics fraction having less than 0.3% of stable non-aromatic hydrocarbons therein boiling in the range of 130–140° C. and then superdistilling said $C_8+$ aromatic fraction to separate ethylbenzene in a distillation column having at least 150 distillation stages at a reflux ratio exceeding 40:1.

13. The method of distilling ethylbenzene from a mixture with xylene isomers, said mixture being substantially free of non-aromatic hydrocarbon, comprising passing vapors of the said mixture through distillation columns comprising 150 to 400 distillation stages while washing said vapors with condensed liquid in each stage passing countercurrently from stage to stage as reflux, said 150 to 400 stages being separated into a plurality of two to three distillation columns of from 50 to 134 stages each, by passing the liquid mixture to be distilled to an intermediate stage of said 150 to 400 stages, pumping hot condensed liquid from the bottom of the last column to the top of the preceding column through the series of columns as reflux, pumping a portion of the liquid from the bottom of the first column to a reboiler and returning the same as hot vapors to a point near the bottom of the first column, condensing ethylbenzene vapors from the last column to a hot liquid at about its boiling point and returning a portion of the final hot liquid ethylbenzene condensate to the top of the last column as reflux, said columns being operated at a reflux ratio in the range of about 40 to 150:1.

14. Method of recovering ethyl benzene contained in a petroleum hydrocarbon naphtha together with other aromatic hydrocarbons comprising solvent extracting the aromatic hydrocarbons in said naphtha with a polar solvent to produce an aromatic extract containing less than 0.3% of stable non-aromatic hydrocarbons therein, removing a substantial quantity of other $C_6$–$C_8$ aromatic hydrocarbon components of said extract to produce a $C_8$ fraction in which ethyl benzene is relatively concentrated, and superdistilling said concentrated ethyl benxene extract in a distillation column having at least 150 distillation stages at a reflux ratio exceeding 40:1 to produce substantially pure ethyl benzene.

15. Method of recovering ethyl benzene contained in a petroleum hydrocarbon naphtha together with other aromatic hydrocarbons comprising solvent extracting the aromatic hydrocarbons in said naphtha with a polar solvent to produce an aromatic extract containing less than 0.3% of stable non-aromatic hydrocarbons therein, distilling said aromatic extract to remove $C_6$ and $C_7$ aromatic hydrocarbons therein and produce a $C_8+$ fraction containing said ethyl benzene removing a portion of the other aromatic components of said $C_8+$ fraction to produce a $C_8$ fraction in which the ethyl benzene is relatively concentrated and superdistilling the ethyl benzene from said concentrated $C_8$ fraction in a distillation column having at least 150 distillation stages at a reflux ratio exceeding 40:1.

References Cited in the file of this patent

UNITED STATES PATENTS 1,955,246    Link _________________ Apr. 17, 1934

(Other references on following page)

UNITED STATES PATENTS

| | | |
|---|---|---|
| 2,295,256 | Brugma | Sept. 8, 1942 |
| 2,407,820 | Durrum | Sept. 17, 1946 |
| 2,734,930 | Schlatter | Feb. 14, 1956 |
| 2,770,663 | Grote | Nov. 13, 1956 |
| 2,773,918 | Stephens | Dec. 11, 1956 |

FOREIGN PATENTS

| | | |
|---|---|---|
| 625,570 | Great Britain | June 30, 1949 |

OTHER REFERENCES

Rossini et al.: Petroleum Refiner, volume 21, No. 11, November 1942, pages 73–78.

Rossini et al.: Hydrocarbons from Petroleum (1953), Reinhold Publishing Corporation, 330 West 42nd Street, New York, New York, page 342.